April 23, 1957  G. A. BRACE  2,789,661
PNEUMATIC FILTER SEAL

Filed Sept. 22, 1954  4 Sheets-Sheet 1

April 23, 1957 G. A. BRACE 2,789,661
PNEUMATIC FILTER SEAL
Filed Sept. 22, 1954 4 Sheets-Sheet 4

United States Patent Office 2,789,661
Patented Apr. 23, 1957

2,789,661
PNEUMATIC FILTER SEAL

George A. Brace, San Carlos, Calif., assignor to The Hoover Company, North Canton, Ohio, a corporation of Ohio Application September 22, 1954, Serial No. 457,738

19 Claims. (Cl. 183—37)

The instant invention relates to suction cleaners and specifically to a novel suction cleaner construction for supporting and maintaining the filter bag in operative position within the suction cleaner, and effecting a seal between the mouth of the filter bag and the seat therefor.

More particularly, this invention relates to suction cleaners of the type adapted to employ a disposable filter bag usually made of a relatively inexpensive paper which is air pervious, but impervious to dust and the like, so that the latter will be separated from the air stream and stored within the filter bag for subsequent disposal therewith. Such filter bags may be utilized with the conventional tank cleaner, in which the filter bag is mounted within the casing of the cleaner with the motor-fan unit located behind the closed end of the filter bag to draw the air therethrough, the bag separating and retaining the dust and the like within its confines.

The disposable filter bag may also be utilized in upright cleaners wherein the filter bag is secured to the cleaner on the discharge side of the motor-fan unit, the fan blowing the air carrying dust and like litter into the filter bag, with the air exhausting through the walls thereof, and the dust and the like accumulating therein for subsequent disposal with the filter bag. In the upright suction cleaner it is customary to include an appearance bag made of cloth which is air pervious, to enclose the paper filter bag to prevent inadvertent rupturing thereof and to enhance the appearance of the unit. In each of these arrangements it is necessary to provide a seat for the mouth of the filter bag, such as will seal the mouth of the filter bag on the seat to prevent air leakage in this area.

It is accordingly the prime object of the present invention to provide a novel means for seating and sealing the mouth of a filter bag within a suction cleaner.

It is also an object of this invention to provide a novel means for seating and sealing the mouth of the filter bag within a suction cleaner which is pneumatically operated.

It is a further object of the instant invention to provide a novel pneumatic means for seating and sealing the mouth of a filter bag in a suction cleaner, which means is operative to seal the mouth of the filter bag on the seat in response to the operation of the motor-fan unit creating a pressure flow of air in the suction cleaner for suction cleaning.

A still further object of the instant invention is to provide a seat for the mouth of a filter bag in a suction cleaner, which includes a flexible or yieldable member which is adapted to be distended into pressure engagement with the mouth of the filter bag to grip the same and to secure it in operative position on the seat for the filter bag mouth. Means responsive to the operation of the motor-fan unit is included, which means is operative to distend the yieldable member in response to the pressure of the air stream and seal the mouth of the filter bag on the seat for securing the same in operative position within the suction cleaner.

It is also an object of the instant invention to provide a novel seat for the mouth of a filter bag in a suction cleaner, which includes a hollow, yieldable member coextensive with the mouth of the filter bag and which has communication with the positive pressure side of the fan in the suction cleaner, so that the pressure thereof may be applied to the interior of the hollow, yieldable member in order to distend the same into engagement with the mouth of the filter bag, to grip and secure it in sealed position on the seat.

It is another object of the instant invention to provide a novel seat for the mouth of a filter bag in a suction cleaner, in which a seal is effected between the mouth of the filter bag and the seat through utilization of the back pressure in the filter bag.

It is still another object of the instant invention to provide a novel seat for the mouth of a filter bag in a suction cleaner in which the seat includes a yieldable or flexible element disposed within the mouth of the filter bag and which is adapted to be distended by the back pressure in the filter bag into positive engagement with the mouth to grip it to effect a seal between said mouth and the seat. In this arrangement the flexible or yieldable element is normally loosely disposed within the mouth of the filter bag so that the two parts may be easily mated, and upon operation of the suction cleaner, creating the back pressure in the filter bag, the flexible or yieldable element is distended by the back pressure as aforementioned.

Still another object of the instant invention is to provide a novel seat for the mouth of a filter bag in a suction cleaner, which contains no moving parts and which is operative to effect a seal between the mouth of the filter bag and the seat in response to the pressure of the flow of air through the cleaner for suction cleaning. It is a feature of the invention that the novel means is not effective to grip the mouth of the filter bag except during operation of the motor-fan unit, so that the mouth of the filter bag can be easily positioned on the seat or removed therefrom when the motor-fan unit is idle.

Further objects and advantages of the instant invention will be readily apparent from the detailed description of the various embodiments thereof which follows, reference being had to the drawings in which.

In the instant invention there is provided a pneumatic seal for securing the mouth of a filter bag in operative position in the suction cleaner. In suction cleaners, whether they be of the conventional tank type or of the conventional upright type, there is created a pressure flow of air for suction cleaning, which flow of air produces a suction pressure within the filter bag in the tank cleaner, or a positive back pressure within the filter bag in an upright cleaner. In accordance with this invention the pressure of the aforementioned flow of air is utilized to operate a sealing element which will be pressed into engagement with the mouth of the filter bag during the operation of the suction cleaner, to positively engage the same and grip it for sealing the filter bag mouth on the seat provided therefor. Upon cessation of operation of the suction cleaner, the pressure due to the flow of air is cut off and the pneumatic sealing means for the mouth of the filter bag is released, so that the filter bag mouth is then freely supported on the seat provided therefor. The filter bag may then be easily removed from the seat for cleaning or disposal, and may be replaced with equal facility.

In the preferred embodiments of the instant invention, the sealing element for the mouth of the filter bag takes the form of a yieldable member which is coextensive with the mouth of the filter bag and to which is applied the suction or positive pressure of the flow of air through the suction cleaner, to distend that yieldable member into positive engagement with the mouth of the filter bag to grip the same and to secure it in operative position, effecting a seal of the mouth of the filter bag on the seat provided therefor.

Figure 1:
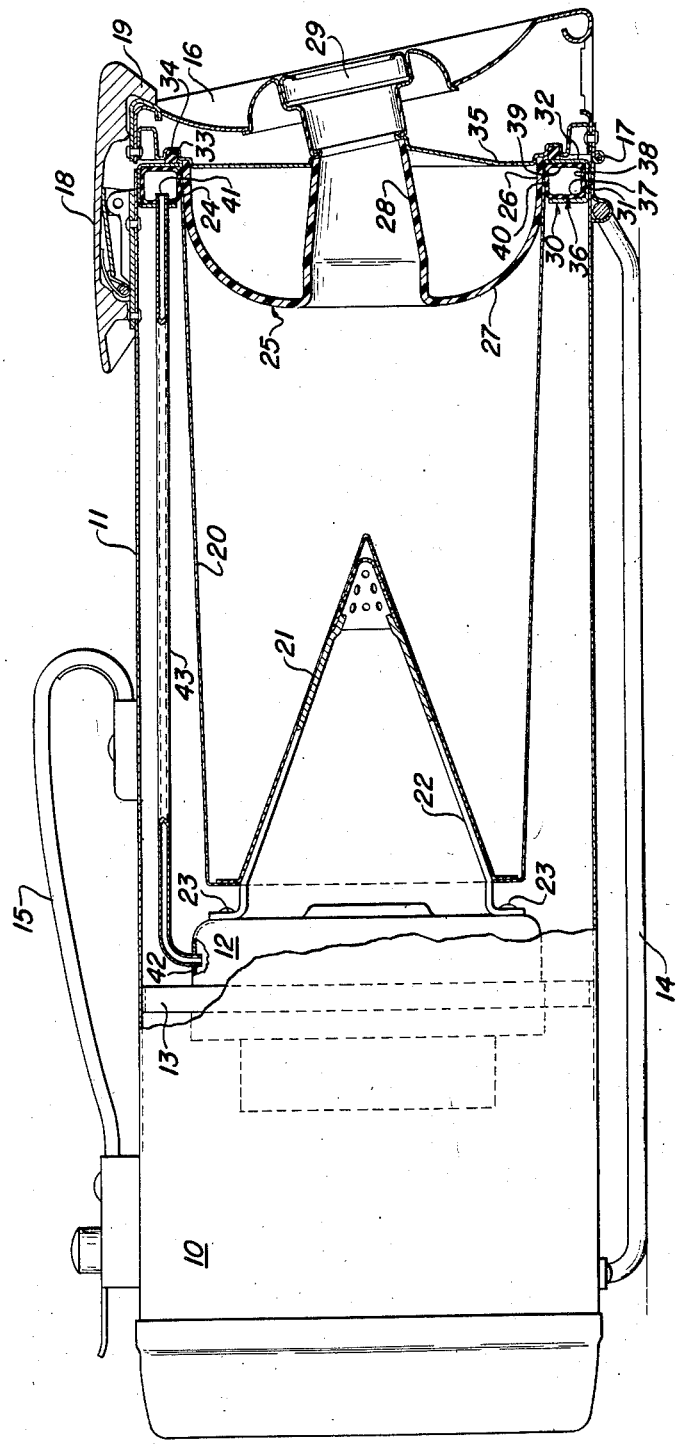
Fig. 1 illustrates one embodiment of the invention as incorporated in a tank suction cleaner.

Referring to Fig. 1, there is illustrated one form of the instant invention as incorporated in a conventional tank cleaner 10 having a casing 11 enclosing a motor-fan unit 12 supported in the casing 11 on a suitable bracket 13 adjacent the rear end of the cleaner. The suction cleaner casing 11 is mounted on a pair of skids 14 secured to the under side thereof to facilitate movement of the cleaner, and it further includes a handle 15 attached to the top of the casing to permit carriage of the cleaner.

The front end of the suction cleaner 10 has an end cap 16 closing the front end of the cleaner casing 11. The end cap 16 is pivotally secured to the cleaner casing 11 by a leaf hinge 17 at the bottom of the cleaner casing 11 in order that the end cap 16 may be opened to permit access to a filter bag 20. A toggle latch 18 is attached to the top of the cleaner casing 11 for securing the end cap 16 in closed position. The tongue 19 of the latch mates with the rim at the top of the end cap 16 to pull it closed against the front end of the suction cleaner casing 11 in sealed engagement therewith, as will be more fully explained hereafter.

The suction cleaner 10 further includes the filter bag 20 disposed in the forward portion of the casing 11 and extending rearwardly from the front end thereof to adjacent the motor fan 12. In the illustrated embodiment of the instant invention, the filter bag 20 includes a re-entrant filter bag portion 21 which is supported on a mating frame 22 extending forwardly from the motor-fan unit 12 and secured thereto by rivets 23 or the like. It will be understood that the particular form of filter bag utilized in practicing the instant invention is not material, and it will be readily apparent that the subject invention may be practiced with filter bags having other configurations than those illustrated in the drawings. It is also noted that the invention has been illustrated as applied to disposable filter bags of the type which are conventionally made of a relatively inexpensive, air pervious paper, but it will be likewise apparent that the invention is not necessarily limited to use with such disposable filter bags.

As is well known to those skilled in the art, it is requisite in the conventional tank suction cleaner illustrated in the drawings that the front end thereof be sealed, in order that the full suction effect of the pressure flow of air created by the motor-fan unit 12 be applied through the walls of the filter bag 20. Thus it becomes necessary that the mouth 24 of the filter bag 20 be sealed on the seat mounting the same in the front end of the cleaner casing 11. This seat includes a pilot 25 projecting inwardly from the front end of the cleaner casing 11 from the back wall 35 of the end cap 16. The pilot 25 is formed with a flat, annular portion 26 disposed immediately behind the wall 35 and upon which the mouth 24 of the filter bag 20 seats. The pilot 25 projects inwardly from the front end of the cleaner casing 11 continuing from the flat, annular portion 26 in an inwardly tapering cross section having a smoothly rounded contour 27, to facilitate insertion of the pilot 25 into the mouth 24 of the filter bag 20. The wall 27 of the pilot 25 terminates in a conduit 28 substantially centrally disposed in the pilot 25 and communicating with the hose coupling 29 provided in the end cap 16 for the reception of a hose for applying the suction pressure to a cleaning tool, in the manner well known in the art.

In the present embodiment of the invention, the front end of the cleaner casing 11 has secured to the inside of its wall in any conventional manner an annular channel 30 having the base 31 thereof disposed on the wall of the cleaner casing 11. The front upstanding leg 32 of the channel 30 constitutes a flange on the front end of the cleaner casing 11 aligned with which is a gasket 33 of annular configuration seated in a correspondingly shaped cavity 34 formed in the back wall 35 of the end cap 16. Thus, upon closing the end cap 16 against the front end of the cleaner casing 11, the gasket 33 will be pressed against the flange 32 by the pressure of the toggle latch 18, thereby sealing the front end of the suction cleaner 10 as aforementioned.

Seated within the annular channel 30 and projecting laterally inwardly from the wall of the cleaner casing 11 is a hollow, yieldable, annular element 36 coextensive with the mouth 24 of the filter bag 20 and with the pilot 25 formed of rubber, plastic or the like yieldable material. In the illustrated embodiment of the invention the yieldable element 36 has a substantially square cross-section, although it will be apparent that this shape is merely exemplary and that the yieldable element 36 may take other forms as well. The walls 37, 38 and 39 of the yieldable element 36 are confined by the base and the legs of the channel 30 so that only the wall 40, which is disposed laterally inwardly of the cleaner casing 11, can yield in response to pressure applied to the inside of the hollow, yieldable member 36.

The hollow, yieldable member 36 is closed except for an inlet 41 formed in the side wall 37, through which pressure may be applied to the inside thereof. The motor-fan unit 12 includes a tap 42 on the positive pressure side of the fan, which is connected to the inlet 41 by a conduit 43 extending longitudinally of the cleaner casing 11, to transmit the pressure from the positive pressure side of the fan to the interior of the hollow member 36. Upon operation of the suction cleaner, the positive pressure created by the motor-fan unit 12 will be transmitted through the conduit 43 to the interior of the yieldable member 36. This build-up of pressure within the yieldable member 36 will distend the wall 40 thereof in opposition to the substantially flat portion 26 of the pilot 25, with the mouth 24 of the filter bag 20 interposed between the yieldable wall 40 and the rigid substantially flat portion 26 of the pilot 25. Thus the mouth 24 of the filter bag 20 will be pressed into positive engagement with the pilot 25 which supports the same within the cleaner casing 11.

Upon cessation of operation of the motor-fan unit 12, the pressure distending the wall 40 of the yieldable member 36 will be released so that the pilot 25 may be freely withdrawn from the front end of the cleaner casing 11 upon opening the end cap 16. In this non-operative condition of the suction cleaner 10, the mouth 24 of the filter bag 20 is loosely supported in the front end of the cleaner casing 11 and may be readily withdrawn therefrom for replacement or cleaning of the filter bag 20.

Figures 2, 3:
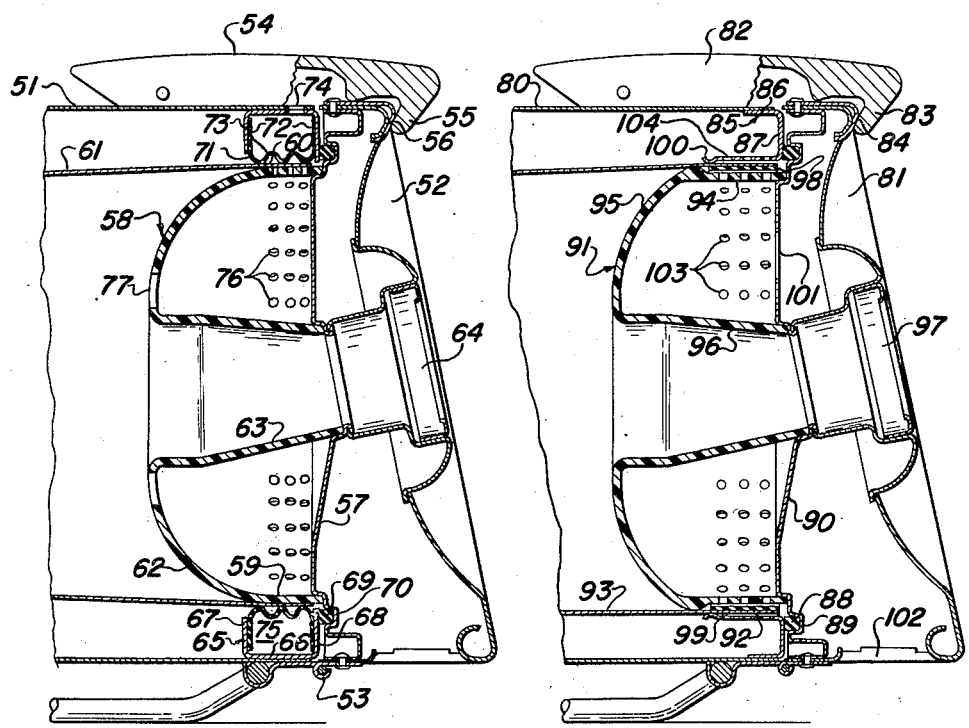
Fig. 2 illustrates another embodiment of the invention as incorporated in a tank suction cleaner.
Fig. 3 illustrates still another embodiment of the instant invention as incorporated in a tank suction cleaner.

Referring now to Fig. 2, there is illustrated another embodiment of the instant invention as incorporated in a tank cleaner having an outer casing 51, the front end of which is closed by an end cap 52 pivotally secured to the front end thereof by a hinge 53 at the bottom of the cleaner casing 51, and having a toggle latch 54 attached to the top of the cleaner casing 51 with a tongue 55 mating with a lip 56 at the top of the end cap 52, for engaging the end cap and closing it against the front end of the cleaner casing 51. Secured to the back wall 57 of the end cap 52 is a pilot 58 which includes a substantially flat annular portion 59 immediately behind the rear wall 57, upon which the mouth 60 of the filter bag 61 is seated. The flat annular portion 59 of the pilot 58 continues inwardly and rearwardly of the front end of the cleaner casing 51 in an inwardly tapering, smoothly rounded cross-section 62 terminating in a conduit 63 disposed substantially centrally of the pilot 58 and communicating with a hose coupling 64 in the end cap 52, to which a hose may be attached for applying suction pressure to a cleaning tool.

In this embodiment of the invention there is provided in the front end of the cleaner casing 51 an annular channel member 65 having a base 66 disposed adjacent the inside wall of the cleaner casing 51 and secured thereto in any conventional manner. Legs 67, 68 project laterally inwardly of the cleaner casing 51 from the base 66 of the channel member 65. The laterally projecting leg 68 constitutes a flange at the front end of the cleaner casing 51, and aligned therewith in the end cap 52 is a correspondingly shaped annular gasket 69 secured in an annularly extending cavity 70 formed in the rear wall 57 of the end cap 52. Upon closing the end cap 52 and securing it in closed position by the latch 54, the gasket 69 will be pressed against the leg or flange 68 thereby effecting a seal between the end cap 52 and the front end of the cleaner casing 51 in the conventional manner.

A yieldable element 71 is disposed in the channel 65, with its marginal portions 72 lying against the legs 67, 68 and being secured thereto by any conventional means to form a closed, annular chamber surrounding the substantially flat portion 59 of the pilot 58. The yieldable member 71 includes an intermediate portion 73 extending between the legs 67, 68 of the channel 65 and projecting slightly beyond the extremities of said legs 67, 68 in opposition to the substantially flat portion 59 of the pilot 58. The yieldable member 71 is preferably made of rubber, plastic or like material that is easily distended in response to the application of pressure thereto. In the preferred embodiment, the intermediate portion 73 of the yieldable member 71 is formed with a corrugated cross-section for the purpose of securing more efficient gripping of the mouth 60 of the filter bag 61, although this configuration may be varied.

The yieldable member 71 and the channel member 65 to which it is secured, together form a closed annularly extending chamber coextensive with the mouth 60 of the filter bag 61 and surrounding the substantially flat portion 59 of the pilot 58. At the top of the cleaner casing 51 there is provided an opening 74 piercing the wall of the cleaner casing 51 as well as the base 66 of the channel member 65, thus providing the annular chamber 75 with communication to the atmosphere. The flat portion 59 of the pilot 58 includes several rows of perforations 76 which are arranged opposite the intermediate portion 73 of the yieldable member 71, and the wall 62 of the pilot 58 includes one or more perforations 77 communicating with the interior of the filter bag 61. Thus the interior of chamber 75 and the inner wall of the intermediate portion 73 of yieldable member 71 will always be at atmospheric pressure, while the opposite outer wall of the intermediate portion 73 will be exposed to the suction pressure of the motor-fan unit, that pressure being applied through apertures 77, 76 and the mouth 60 of the filter bag 61.

It will accordingly be apparent that upon operation of the suction cleaner creating the aforementioned suction pressure, a positive pressure will be applied to the chamber 75 and to the intermediate portion 73 of the yieldable member 71, thus distending the latter in opposition to the flat portion 59 of the pilot 58, with the mouth 60 of the filter bag 61 interposed therebetween. The distending of the intermediate portion 73 of the yieldable member 71 will cause it to positively engage the mouth 60 of the filter bag 61 on the seat provided therefor in the front end of the cleaner casing 51 by pressing the mouth 60 into positive engagement against the flat portion 59, thereby effecting the requisite seal of the mouth 60 in the front end of the suction cleaner casing 51, to apply the full suction pressure through the walls of the filter bag 61 and to prevent the escape of dust and the like from the filter bag 61.

A further embodiment of the instant invention as applied to a suction tank cleaner is illustrated in Fig. 3. The tank cleaner again includes a cleaner casing 80 closed at its front end by an end cap 81 which is secured thereto by a latch 82 having a tongue 83 engaging a lip 84 provided at the top front of the end cap 81. The front end of the cleaner casing 80 includes a channel member 85 having one leg 86 secured to the inside of the wall of the cleaner casing 80 with the web 87 projecting laterally inwardly from the wall of the cleaner casing 80. The web 87 of the channel member 85 constitutes a flange at the front end of the cleaner casing 80 extending annularly thereof. The end cap 81 includes a gasket 88 aligned with the web or flange 87, correspondingly shaped with respect thereto, and seated in an annular cavity 89 formed in the rear wall 90 of the end cap 81. Upon closing end cap 81, the gasket 88 will bear against the flange 87, and a latch 82 will pull the end cap closed against the front end of the cleaner casing 80, pressing the gasket 88 into engagement with the flange 87 to effect a seal between the end cap 81 and the front end of the cleaner casing 80 in the previously described manner.

Also secured to the rear wall 90 of the end cap 81 is a pilot 91 for seating the mouth 92 of a filter bag 93. The pilot 91 includes a substantially flat portion 94 located immediately behind the rear wall 90 of the end cap 81 and continues rearwardly in an inwardly tapering and smoothly rounded portion 95 which terminates in a conduit 96 communicating with a hose coupling 97 in the end cap 81, for reception of a hose having a cleaning tool for the application of the suction pressure to the latter.

Surrounding the flat portion 94 of the pilot 91 is an endless band of yieldable material 98 which is coextensive with said flat portion 94 and with the mouth 92 of the filter bag 93. The endless yieldable band 98 is preferably made from rubber, plastic or like material which is capable of being distended upon the application of pressure thereto. In the preferred embodiment, the band 98 is of substantially the same size as the pilot portion 94 so as to be freely maintained thereon. The channel member 85 further includes a leg 99 projected inwardly of the front end of the cleaner casing 80 from the web 87. The leg 99 is disposed in opposition to the yieldable band 98 and is coextensive therewith, the mouth 92 of the filter bag 93 being interposed between the leg 99 and the yieldable band 98. The rearwardly disposed end of the leg 99 is formed with a downwardly directed bead 100 pressing against the adjacent edge of the yieldable member 98 for a purpose which will be described in detail hereinafter.

For reasons which will be apparent, the inside of the pilot 91 is exposed to atmospheric pressure by means of an opening 101 provided in the rear wall 90 of the end cap 81, said opening 101 having communication with the atmosphere through the hand-hold opening 102 in the bottom of the end cap 81. The flat pilot portion 94 includes a plurality of annularly disposed apertures 103 which are disposed under and in alignment with the yieldable band 98. The channel leg 99 is also provided with a plurality of apertures 104 similarly aligned with the yieldable band 98. Since the inside of the pilot 91 is exposed to atmospheric pressure, this pressure will be transmitted to the under side of the yieldable band 98, through the apertures 103. The outer surface of the yieldable band, however, will be exposed to the suction pressure of the cleaner, communication being had therewith through the apertures 104 in the leg 99 and through the mouth 92 of the filter bag 93 which is interposed between the yieldable band 98 and the channel leg 99.

As previously described, the bead 100 presses on the adjacent edge of the yieldable band 98, thereby sealing the yieldable band 98 at its rearward edge against the flat pilot portion 94 and providing an air-tight seal at this junction. Thus, the major portion of the yieldable band 98 is contained within an enclosed chamber constituting the flat pilot portion 94, the bead 100, the leg 99 and the seal 88. On the under side of the band 98 this closed chamber is open to the atmosphere through the apertures 103 and on the opposite side of the yieldable band 98 this closed chamber is open to the suction pressure of the cleaner through the apertures 104 in the leg 99. Thus, upon operation of the suction cleaner the yieldable band 98 will be distended in a direction away from the flat portion 94 of the pilot 91 to press the mouth 92 of the filter bag 93 into positive engagement with the leg 99 to seal the mouth thereagainst. Upon cessation of the operation of the suction cleaner, the mouth 92 of the filter bag 93 will be loosely held on the seat in the front end of the cleaner casing 80 and may then be readily removed therefrom for replacement.

As an alternative construction, the edges of the yieldable band 98 may be secured to the flat pilot portion 94 by means of an adhesive or the like to confine the suction pressure to the under side of the yieldable band 98. However, it has been found that the instant embodiment will work as well with either construction.

Figs. 4 to 8 illustrate further embodiments of the instant invention in a pneumatic seal for the mouth of a filter bag as applied to a conventional upright suction cleaner 110 having an unshown motor-fan unit in a housing 111, discharging dirt laden air through a discharge nozzle 112 into a filter bag. The filter bag is sealed to the discharge nozzle 112 to receive the pressure flow of air carrying the dust and like litter, the latter being separated from the flow of air by the filter bag and the air discharging through the walls thereof. The filter bag is enclosed in an appearance bag 113 which is preferably made of air pervious cloth and suspended by a spring 115 from the cleaner handle 114 which is pivotally mounted on the suction cleaner housing 111 for manipulation of the cleaner. As is well known in the art, the suction pressure is applied to the nozzle 116 and the motor-fan unit discharges a positive pressure flow of air carrying the dust and the like through the discharge nozzle 112 into the filter bag which is secured thereto.

Figure 4:
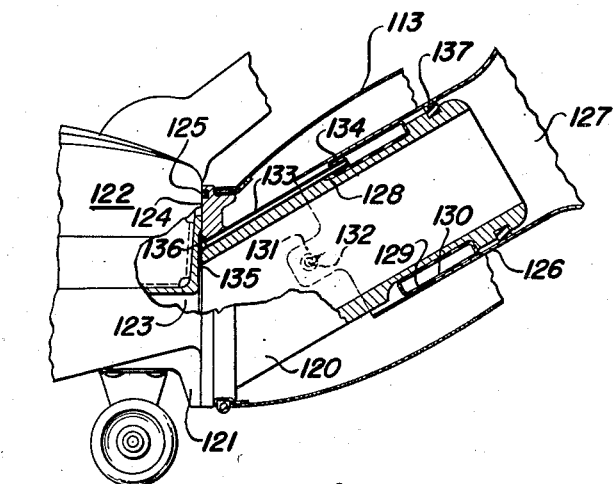
Fig. 4 illustrates an embodiment of the instant invention as incorporated in an upright suction cleaner.

One embodiment of the instant invention as applied to an upright suction cleaner is illustrated in Fig. 4. The suction cleaner includes a filter adapter 120 secured to the rear wall 121 of the cleaner housing 112 and communicating with the discharge nozzle 123. The filter adapter 120 includes a gasket 125 to provide an air-tight seal at the junction 124 between the filter adapter 120 and the rear wall 121 of the suction cleaner. The filter adapter 120 extends upwardly and rearwardly from the suction cleaner housing 122 to constitute a seat for the mouth 126 of a filter bag 127. Spaced forwardly of the discharge end of the filter adapter 120 there is formed the outer wall thereof an annular cavity 128. A yieldable tube 129 is seated in the cavity 128 to extend around the filter adapter 120 with at least one wall 130 of the tube 129 projecting slightly beyond the outer surface of the filter adapter 120.

In attaching the filter bag 127 to the filter adapter 120, the mouth 126 of the filter bag 127 is telescoped over the filter adapter 120 and over the yieldable tube 129, the latter being coextensive with the filter bag mouth 126 and of such normal size that it will readily permit the filter bag mouth 126 to be positioned thereover. The filter bag 127 further includes one or more tabs 131 formed with a buttonhole or the like, so that the tab 131 may be secured to a boss 132 projecting from the outer wall of the filter adapter 120 to retain the filter bag 127 in properly assembled position when the suction cleaner is not operating.

In operation of the suction cleaner, a pressure flow of air carrying the dust and like litter is discharged by the motor-fan unit through the discharge nozzle 123 into the filter bag 127. The air in this stream has a positive pressure, the suction pressure being applied to the nozzle 116 of the cleaner for lifting the dust and the like from the surface being cleaned. In accordance with the invention, the positive pressure of the discharge stream of air is applied to the inside of the yieldable tube 129 to distend the wall 130 thereof into pressure engagement with the inside wall of the mouth 126 of the filter bag 127, providing a positive pressure seal between the filter bag mouth 126 and the filter adapter 120.

In order to accomplish the aforementioned purposes, a tube 133 is provided on the filter adapter 120 and is connected with the interior of the yieldable tube 129 at its rear end 134. The rear wall 121 of the cleaner housing 122 includes a small passageway 135 providing communication between the discharge nozzle 123 and the adjacent end 136 of the tube 133, to transmit the positive pressure of the discharging air stream to the interior of the yieldable tube 129 for the purpose described. The end 136 of the tube 133 may further include a filter (not illustrated) to prevent the accumulation of dust and the like within the tube 133 and the yieldable tube 129. As in the previously described embodiments of the invention, the yieldable tube 129 may be constructed of rubber, plastic or like material which is readily distended upon the application of pressure thereto.

Intermediate the discharge end of the filter adapter 120 and the yieldable tube 129 there is included an annular ring 137 which may be constructed of fiber or like material, and which is of such diameter as to permit the positioning of the mouth 126 of the filter bag 127 thereover. This ring 137 serves as a dirt seal to prevent the accumulation of dust and the like on the filter adapter 120 adjacent the filter sealing tube 129.

Figure 5:
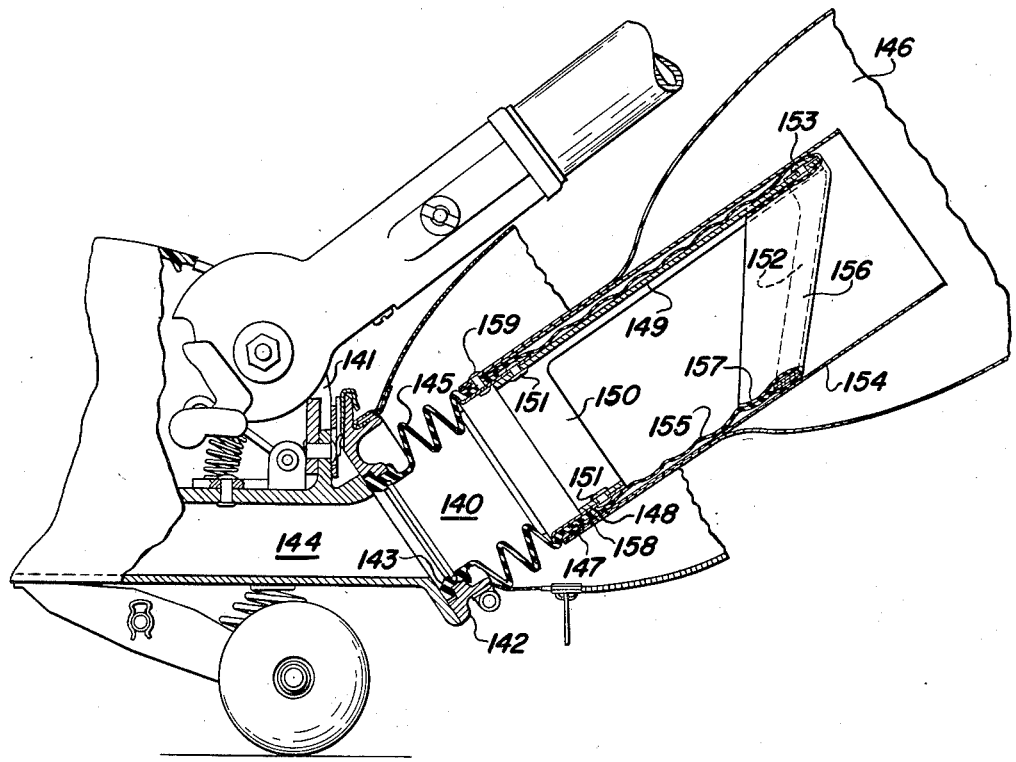
Fig. 5 illustrates another embodiment of the instant invention as incorporated in an upright suction cleaner.
Figure 6:
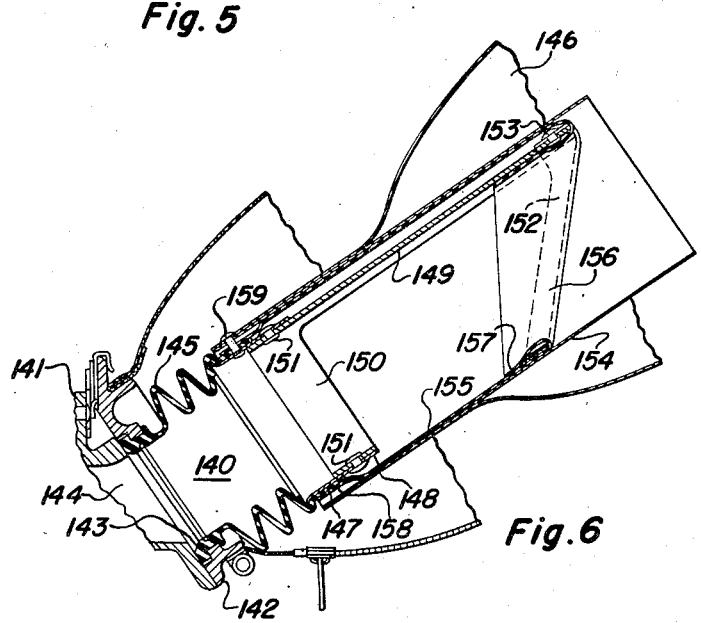
Fig. 6 illustrates the embodiment of the invention shown in Fig. 5 in which the seat for the mouth of the filter bag is distended into position to engage the same.
Figure 8:
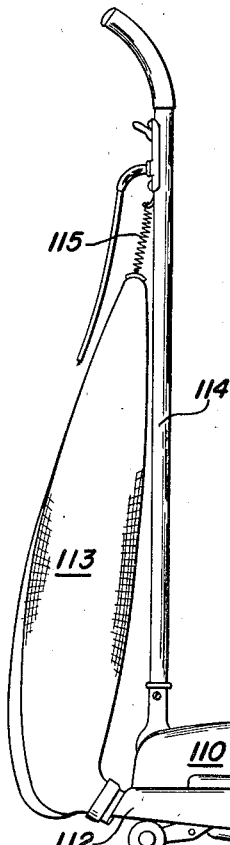
Fig. 8 illustrates the upright cleaner in which the embodiments of Figs. 4 to 7 may be incorporated.

Figs. 5 and 6 illustrate another embodiment of the instant invention as applied to an upright suction cleaner. In this embodiment the filter adapter 140 is secured to the cleaner housing 141 by means of a mounting plate 142 which includes a gasket 143 abutting the cleaner housing 141, to provide an air-tight seal between the plate 142 and the housing 141. The filter adapter 140 has communication with the air discharge nozzle 144 of the suction cleaner through the mounting plate 142. The filter adapter 140 includes a resilient conduit, preferably in the form of a bellows 145, which is integrally formed with the gasket 143 to provide a flexible connection between a filter bag 146 and the housing 141 of the suction cleaner. The flexible connection 145 terminates in a cylindrical wall portion 147 supporting a short, rigid tubular section 148, which in turn supports a post 149 having a cylindrical base 150 secured to the tubular section 148 by rivets 151 or the like. The post 149 at its top supports a hanger 152 made of light spring steel or the like, secured thereto by a rivet 153. The hanger 152 is preferably mounted at an angle with respect to the post 149 in order to facilitate telescoping the mouth 154 of the filter bag 146 thereover.

The seal for the mouth 154 of the filter bag 146 comprises a yieldable member 155 which is in the nature of a tubular diaphragm coextensive with the filter bag mouth 154 and preferably made of rubber, plastic or like material which is readily distended upon the application of pressure thereto. The upper end of the yieldable seal 155 is formed with a loop 156 and the overlapping ends 157 are secured together by the application of an adhesive or by heat sealing or like conventional means.

The lower end 158 of the sealing member 155 is secured to the cylindrical portion 147 of the flexible connection 145.

When the suction cleaner is not in operation, as illustrated in Fig. 5, the sealing member 155 will hang limply on the hanger 152 in a somewhat collapsed position; however, upon operation of the suction cleaner, there will be built up in the filter bag 146, as well as in the filter adapter 140, a positive pressure due to the discharge from the motor-fan unit. This action produces a back pressure in the assembly, which pressure will be applied to the inside wall of the yieldable seal 155, to distend the same against the wall of the filter bag mouth 154, as shown in Fig. 6. The filter seal 155 will be pressed into positive engagement with the filter bag mouth 154 to effect a pressure seal of the filter bag mouth 154 on the filter adapter 140 and to positively secure the filter bag 146 in operative position on the filter adapter 140. The filter bag 146 may include an aperture or buttonhole at its lower edge to be attached to a boss 159 included on the filter adapter 140 to hold the filter bag in place when the suction cleaner is not operating.

In the preferred embodiment, the yieldable member 155 is of slightly greater diameter than the mouth 154 of the filter bag 146 in order to insure that it be firmly pressed against the inside of the filter bag mouth 154 upon operation of the cleaner and build-up of the back pressure in the filter bag 146 and the filter adapter 140. When the suction cleaner is not in operation the yieldable member 155 will hang limply from the hanger 152 and the filter bag mouth 154 may then be freely telescoped over the filter adapter or removed therefrom for replacement.

Figure 7:
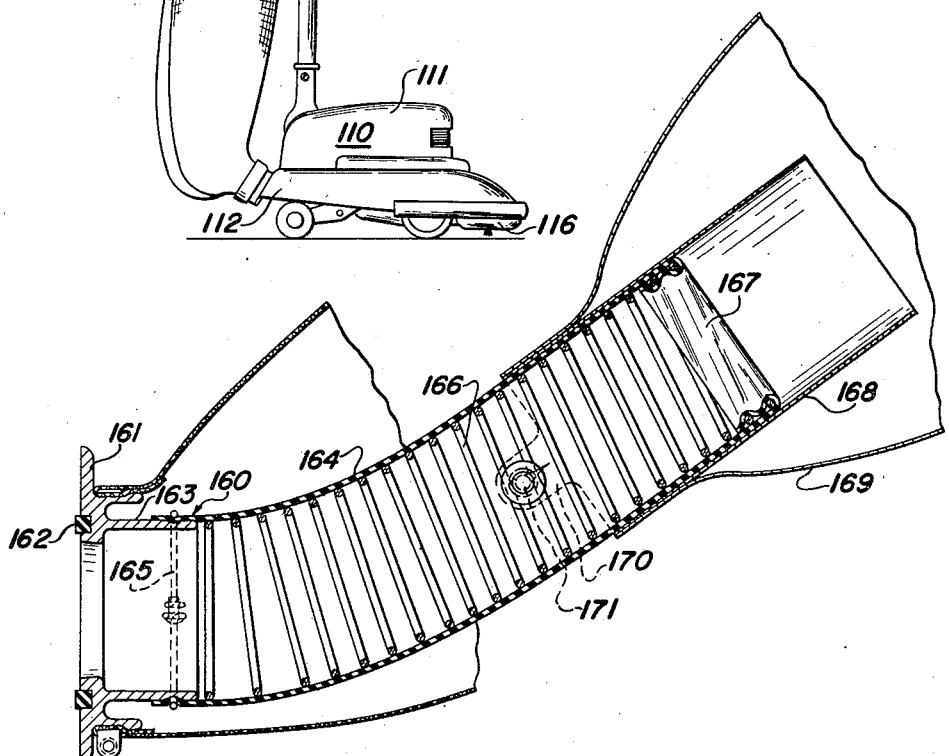
Fig. 7 illustrates still another embodiment of the instant invention as incorporated in an upright cleaner.

Still another embodiment of the instant invention as applied to an upright suction cleaner is illustrated in Fig. 7, in which a filter adapter 160 includes the usual mounting plate 161 for securing the filter adapter 160 to the suction cleaner housing in communication with the discharge nozzle thereof. The mounting plate 161 includes a gasket 162 surrounding the opening therein for sealing the mounting plate 161 to the rear of the suction cleaner housing. A short rigid tube 163, integral with the plate 161, extends rearwardly therefrom. A yieldable conduit 164, coextensive with the filter bag mouth, is secured to the short tube 163 by means of a conventional clamping ring 165.

In the preferred embodiment, the wall of the yieldable conduit 164 is supported by a coiled spring 166 mounted internally of the conduit 164 and extends longitudinally thereof and has a diameter equal to the inside diameter of the conduit 164 in its normal position. The discharge end 167 of the conduit 164 may be looped upon itself overlapping one or more end coils of the spring 166 and the looped end of the conduit 164 may be secured by means of an adhesive or heat sealing to secure the spring 166 within the conduit 164. The conduit 164 is preferably made of rubber, plastic or like material which is readily yieldable and which will be distended upon the application of pressure thereto.

The mouth 168 of the filter bag 169 is telescoped over the end of the conduit 164 and is coextensive therewith. Upon operation of the suction cleaner, a back pressure will be built up in the filter bag 169 as well as in the conduit 164 as described above, which back pressure will be applied to the inner wall of the conduit 16, distending the same and pressing it into positive engagement against the mouth 168 of the filter bag 169. Thus, the filter bag 169 will be positively secured to the filter adapter 160 and sealed thereto through the medium of the yieldable conduit 164.

The filter bag 169 may also include a tab 170 having formed therein an aperture or a buttonhole so that the tab may be fastened onto a boss 171 on the side of the conduit 164, thus providing means for holding the filter bag in position on the filter adapter 160 when the suction cleaner is not operative. It will be apparent that when the suction cleaner is not operating the filter bag mouth 168 will be loosely supported on the conduit 164 so that it may be easily telescoped thereover or removed for replacement.

While a number of embodiments of the instant invention in a pneumatic filter seal have been illustrated and described, further modifications of the invention will occur to those skilled in the art and, accordingly, it is not intended that the scope of the invention be limited, except as set forth in the claims which follow.

I claim:

1. In a suction cleaner having a motor-fan unit for creating a pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including yieldable means responsive to air pressure for engaging the mouth of the filter bag to grip the same for retaining it in positive sealing engagement with the seat, means connecting said yieldable means with said flow of air for distending said yieldable means against the mouth of the filter bag to provide a pressure engagement of the filter bag mouth on the seat to secure the bag in operative sealed position in the suction cleaner.

2. In a suction cleaner having a motor-fan unit for creating the pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including yieldable means responsive to air pressure for engaging the mouth of the filter bag to grip the same for retaining it in positive sealing engagement with the seat, means connecting said yieldable means with said flow of air for applying a positive pressure to said yieldable means to distend the latter against the mouth of the filter bag to provide a pressure engagement of the filter bag mouth on the seat to secure the filter bag in operative sealed position in the suction cleaner.

3. In a suction cleaner having a motor-fan unit for creating a pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including a closed chamber coextensive with the mouth of the filter bag and having a yieldable wall disposed contiguously to the mouth of the filter bag to grip the same for retaining it in positive sealing engagement with the seat, means communicating with said flow of air for applying a positive pressure to the interior of said chamber to distend said yieldable wall against the mouth of the filter bag to provide a pressure engagement of the filter bag mouth on the seat to secure the filter bag in operative sealed position in the suction cleaner.

4. In a suction cleaner having a motor-fan unit for creating a pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including a closed hollow chamber coextensive wtih the mouth of the filter bag and including a yieldable wall disposed contiguously to the mouth of the filter bag for engaging said mouth to grip the same for retaining it in positive sealing engagement with the seat, means communicating with the positive pressure side of the fan for applying a positive pressure to the interior of said hollow chamber to distend said yieldable wall against the mouth of the filter bag to provide a pressure engagement of the filter bag mouth on the seat to secure the bag in operative sealed position in the suction cleaner.

5. In a suction cleaner having a motor-fan unit for creating a pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including a closed hollow chamber coextensive with the mouth of the filter bag and including a yieldable wall disposed contiguously to the mouth of the filter bag for engaging said mouth to grip the same for retaining it in positive sealing engagement with the seat, means for applying a positive pressure to the interior of said hollow chamber including a tap on the positive pressure side of the fan communicating with the interior of said chamber to distend said yieldable wall against the mouth of the filter bag to provide a a pressure engagement of the filter bag mouth on the seat to secure the bag in operative sealed position in the suction cleaner.

6. In a suction cleaner having a motor-fan unit for creating a pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including yieldable means for engaging the mouth of the filter bag to grip the same for retaining it in positive sealing engagement with the seat, means communicating with the positive pressure side of the fan and with said yieldable means to apply a positive pressure to the latter to distend the yieldable means against the mouth of the filter bag to provide a pressure engagement of the filter bag mouth on the seat to secure the bag in operative sealed position in the suction cleaner.

7. In a suction cleaner having a motor-fan unit for creating a pressure flow of air for suction cleaning, a filter bag interposed in the path of said flow of air for separating and retaining dust and the like carried by the air stream, means for mounting said filter bag in operative position in the suction cleaner comprising a seat for the mouth of the filter bag, said seat including yieldable means coextensive with and contiguous to the mouth of the filter bag for engaging the mouth of the filter bag to grip the same for retaining it in positive sealing engagement with the seat, means including a tap on the positive pressure side of the fan communicating with said yieldable means to apply a positive pressure to the latter to distend the yieldable means against the mouth of the filter bag to provide a pressure engagement of the filter bag mouth on the seat to secure the bag in operative sealed position in the suction cleaner.

8. In a suction cleaner having a motor-fan unit for creating a suction pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including a closed chamber coextensive with the mouth of the filter bag and having a yieldable wall disposed contiguously to the mouth of the filter bag to grip the same for retaining it in positive sealing engagement with the seat, the interior of said chamber having communication with the atmosphere and the outer surface of said yieldable wall having communication with the suction flow of air for applying a positive pressure to the interior of said chamber to distend said yieldable wall against the mouth of the filter bag to provide a pressure engagement of the filter bag mouth on said seat to secure the filter bag in operative sealed position in the suction cleaner.

9. In a suction cleaner having a motor-fan unit for creating a suction pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag including a support disposed within said mouth and coextensive therewith, and a closed chamber surrounding and coextensive with the mouth of the filter bag and the support, said closed chamber including a yieldable wall disposed contiguously to the mouth of the filter bag to grip the same for retaining it in positive sealing engagement with the support, the interior of said chamber having communication with the atmosphere and the outer surface of said yieldable wall having communication with the suction flow of air for applying a positive pressure to the interior of said chamber to distend said yieldable wall against the mouth of the filter bag to provide a pressure engagement of the filter bag mouth on the seat to secure the filter bag in operative sealed position in the suction cleaner.

10. In a suction cleaner having a motor-fan unit for creating a suction pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including yieldable means for engaging the mouth of the filter bag to grip the same for retaining it in positive sealing engagement with the seat, means for applying a suction pressure to said yieldable means to distend the same against the mouth of the filter bag to provide a pressure engagement of the filter bag mouth on the seat to secure the bag in operative sealed position in the suction cleaner.

11. In a suction cleaner having a motor-fan unit for creating a suction pressure flow of air for suction cleaning, a filter bag interposed in the path of said flow of air for separating and retaining dust and the like carried by the air stream, means for mounting said filter bag in operative position in the suction cleaner comprising a seat for the mouth of the filter bag, said seat including yieldable means coextensive with the mouth of the filter bag for engaging the mouth of the filter bag to grip the same for retaining it in positive sealing engagement with the seat, one side of said yieldable means having communication with the atmosphere and the opposite side of said yieldable means communicating with the suction flow of air for applying a suction pressure to said yieldable means to distend the same against the mouth of the filter bag to provide a pressure engagement of the filter bag mouth on the seat to secure the bag in operative sealed position in the suction cleaner.

12. In a suction cleaner having a motor-fan unit for creating a suction pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including a support for the mouth of the filter bag disposed within said mouth, a yieldable member on the support coextensive with and contiguous to the mouth of the filter bag to grip the same for retaining it in positive sealing engagement with the seat, one side of said yieldable member having communication with the suction flow of air for applying a suction pressure to said yieldable member to distend the same against the mouth of the filter bag to provide a pressure engagement of the filter bag mouth on the seat to secure the bag in operative sealed position in the suction cleaner.

13. In a suction cleaner having a motor-fan unit for creating a suction pressure flow of air for suction cleaning, a filter bag interposed in the path of said flow of air for separating and retaining dust and the like carried by said air stream, means for mounting said filter bag in operative position in the suction cleaner comprising, a seat for the mouth of the filter bag, said seat including a support for the mouth of the filter bag coextensive with and disposed within the mouth of the filter bag, a yieldable band on the support coextensive with and contiguous to the mouth of the filter bag to grip the same for retaining it in positive sealing engagement with the seat, said yieldable band having communication with the atmosphere through the support and having communication with the suction flow of air through the filter bag for applying a suction pressure to said yieldable band to distend the same against the mouth of the filter bag to provide a pressure engagement of the filter bag mouth on the seat to secure the bag in operative sealed position in the suction cleaner.

14. In a suction cleaner having a motor-fan unit for creating a pressure flow of air for suction cleaning, a filter bag interposed in the path of said flow of air for separating and retaining dust and the like carried by the air stream, means for mounting said filter bag in operative position in the suction cleaner comprising, a seat for the mouth of the filter bag, said seat including yieldable means for engaging the mouth of the filter bag to grip the same for retaining it in positive sealing engagement with the seat, said yieldable means having communication with said flow of air for applying a back pressure to the yieldable means to distend said means against the mouth of the filter bag to provide a pressure engagement of the filter bag on the seat to secure the bag in operative sealed position in the suction cleaner.

15. In a suction cleaner having a motor-fan unit for creating a pressure flow of air for suction cleaning, a filter bag interposed in the path of said flow of air on the discharge side of the fan for separating and retaining dust and the like carried by the air stream, means for mounting said filter bag in operative position in the suction cleaner comprising, a support for the filter bag disposed on the discharge side of the fan and including a seat for the mouth of the filter bag, said seat having a hanger extending into the mouth of the filter bag, a yieldable member supported on the hanger coextensive with the mouth of the filter bag for engaging the mouth of the filter bag to grip the same for retaining it in positive sealing engagement with the seat, said yieldable member having communication with said flow of air for applying a back pressure to the yieldable member to distend said member against the mouth of the filter bag to provide a pressure engagement of the filter bag mouth on the seat to secure the bag in operative sealed position in the suction cleaner.

16. In a suction cleaner having a motor-fan unit for creating a pressure flow of air for suction cleaning, a filter bag interposed in the path of said flow of air on the discharge side of the fan for separating and retaining dust and the like carried by the air stream, means for mounting said filter bag in operative position in the suction cleaner comprising, a support for the filter bag disposed on the discharge side of the fan, said support including a seat for the mouth of the filter bag having a hanger extending into the mouth of the filter bag, a tubular yieldable diaphragm of substantially the same diameter as the interior of the mouth of the filter bag loosely suspended on the hanger and coextensive with the mouth of the filter bag for engaging the mouth of the filter bag to grip the same for retaining it in positive sealing engagement with the seat, said diaphragm having communication with said flow of air for applying a back pressure to the diaphragm to distend said diaphragm against the mouth of the filter bag to provide a pressure engagement of the filter bag mouth on the seat to secure the bag in operative sealed position in the suction cleaner.

17. In a suction cleaner having a motor-fan unit for creating a pressure flow of air for suction cleaning, a filter bag interposed in the path of said flow of air on the discharge side of the fan for separating and retaining dust and the like carried by the air stream, means for mounting said filter bag in operative position in the suction cleaner comprising, a filter bag support disposed on the discharge side of the fan including a seat for the mouth of the filter bag, said seat extending into the mouth of the filter bag and comprising a yieldable member coextensive with said mouth for engaging the mouth of the filter bag to grip the same for retaining it in positive sealing engagement with the support, said yieldable member having communication with the flow of air for applying a back pressure to the yieldable member to distend said member against the mouth of the filter bag to provide a pressure engagement of the filter bag mouth on the seat to secure the bag in operative sealed position in the suction cleaner.

18. In a suction cleaner having a motor-fan unit for creating a pressure flow of air for suction cleaning, a filter bag interposed in the path of said flow of air on the discharge side of the fan for separating and retaining dust and the like carried by the air stream, means for mounting said filter bag in operative position in the suction cleaner comprising, a filter bag support disposed on the discharge side of the fan, said support including a seat for the mouth of the filter bag having a yieldable tubular element projecting in the direction of the flow of air, said tubular element being of substantially the same diameter as the interior of the mouth of the filter bag and adapted to be disposed in the mouth of the filter bag contiguously thereto for engaging the mouth of the filter bag to grip the same for retaining it in positive sealing engagement with the seat, said yieldable tubular element having communication with said flow of air for applying a back pressure to the interior wall thereof to distend said element against the mouth of the filter bag to provide a pressure engagement of the filter bag mouth on said element to secure the bag in operative sealed position in the suction cleaner.

19. Means for mounting a filter bag in a suction cleaner as recited in claim 18 including coiled spring means disposed within said tubular yieldable element for supporting the wall of the element and rigidifying the tubular element to prevent collapse thereof upon cessation of the pressure flow of air.

References Cited in the file of this patent

UNITED STATES PATENTS

| | | |
|---|---|---|
| 831,603 | Davis | Sept. 25, 1906 |
| 2,245,953 | Anderson et al. | June 17, 1941 |
| 2,559,564 | Sperling | July 3, 1951 |
| 2,582,219 | Ardito et al. | Jan. 15, 1952 |

FOREIGN PATENTS

| | | |
|---|---|---|
| 997,741 | France | Jan. 9, 1952 |